(No Model.)

C. L. KLINE.
METALLIC SELF VENTING BUNG.

No. 464,974.　　　　　　　　Patented Dec. 15, 1891.

Attest:
L. Paul Harwood
L. V. Harwood

Inventor:
Charles L. Kline.
by his Atty.
G. H. Stockbridge

UNITED STATES PATENT OFFICE.

CHARLES L. KLINE, OF NEW YORK, N. Y.

METALLIC SELF-VENTING BUNG.

SPECIFICATION forming part of Letters Patent No. 464,974, dated December 15, 1891.

Application filed March 27, 1891. Serial No. 386,637. (No model.)

*To all whom it may concern:*

Be it known that I, CHARLES L. KLINE, a citizen of the United States, residing at New York, in the county of New York and State of New York, have invented certain new and useful Improvements in Metallic Self-Venting Bungs; and I do hereby declare the following to be a full, clear, and exact description of the invention, such as will enable others skilled in the art to which it appertains to make and use the same.

My invention relates to improvements in self-venting bungs, and more particularly to certain features which are necessary to make such bungs reliable and efficient.

In carrying out my invention I have developed a construction which is simple, and the various features of which may be described as follows:

A vent having means for attachment to a bung, an air-passage in the said vent, a gate or valve closing the said air-passage, and projecting walls within which the said gate or valve rests.

A vent having means for attachment to a bung, an air-passage in the said vent, a gate or valve closing the said passage, and a ledge or shoulder projecting beyond the outer limit of movement of the said gate or valve, and projecting walls also extending beyond the said limit of movement, as and for the purpose set forth.

The combination, in a bung having an internal end opening, of a plug screwing into the said opening, the said plug having a passage ending in a conical valve-seat, and an adjustable vent terminating in a conical valve, as set forth.

In a bung, an adjustable valve-seat and an adjustable vent carrying the corresponding valve, the said vent having a shoulder co-operating with a suitable detent for limiting its movement away from the said valve-seat, as and for the purpose set forth.

In a bung, an adjustable valve-seat and an adjustable vent carrying the corresponding valve, the said vent being screwed into the upper wall of the bung and having a circular shoulder co-operating with the inner surface of the said wall, with an interposed bushing to prevent leakage, as and for the purpose set forth.

A metallic bung having an air-passage through it, the said air-passage being controlled at each of two points by a valve, the outer of the said valves being automatic and the inner of the said valves being formed in part by an adjustable portion of the bung, so as to be capable of operation by hand, as and for the purpose set forth.

The construction of my apparatus can be readily seen from the accompanying drawings, in which—

Figure 1:
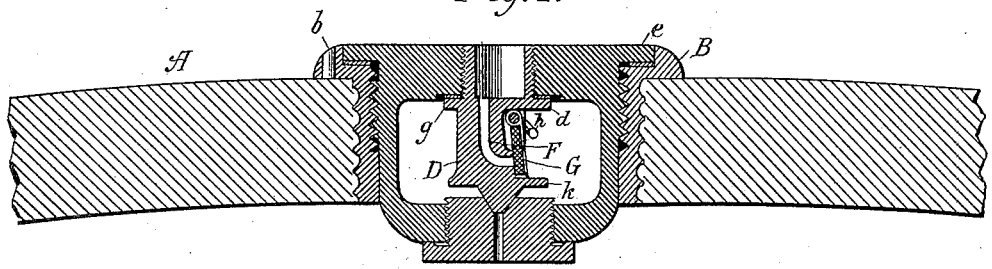
Figure 2:
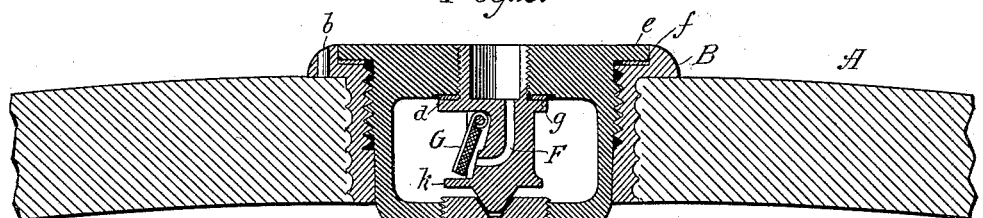
Figure 5:
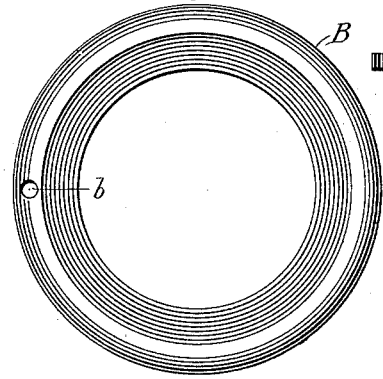
Figure 3:
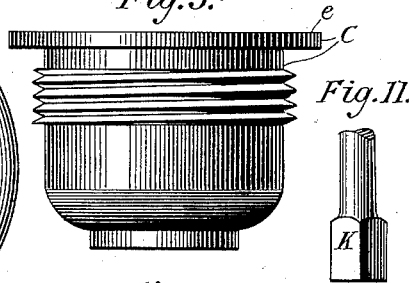
Figure 7:
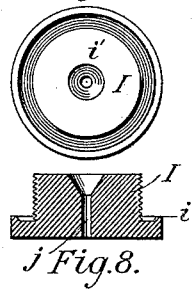
Figure 11:
Figure 8:
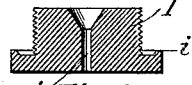
Figure 6:
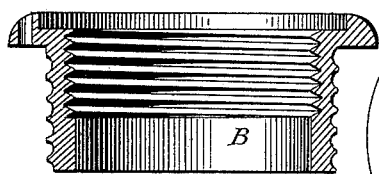
Figure 4:
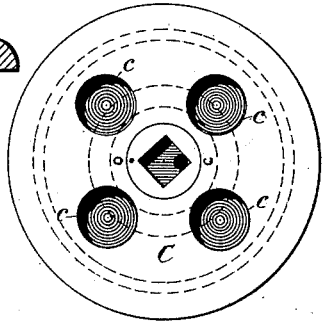
Figures 9, 10:
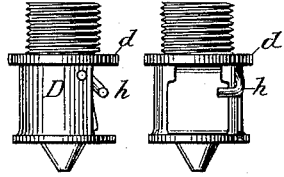

Figure 1 is a sectional view showing the vent closed. Fig. 2 is a similar view showing the vent open. Fig. 3 is an elevation of the metallic bung, and Fig. 4 is a top view of the same. Fig. 5 is a plan of the metallic bushing which surrounds the bung. Fig. 6 is a vertical section of the same. Figs. 7 and 8 are respectively a plan and a section of a screw-threaded valve-seat employed in my apparatus. Figs. 9 and 10 are front and side elevations of the vent-valve, and Fig. 11 is a portion of a key which I use for operating the vent.

Referring to the drawings by letter, A is a section of a barrel-stave in which my bung is secured.

B is a bushing made of suitable metal and screwed into an opening in the bung-stave A.

At $b$ is an opening for a screw, which is intended to secure the bushing from being loosened after it has been screwed into place.

The bushing B is internally screw-threaded to receive the bung C, whose exterior is correspondingly screw-threaded.

At the top of the bung are shown key-holes $c\ c\ c\ c$ to receive a key for turning the bung into place.

In the top of the bushing B is formed a depression, to which corresponds a shoulder $e$ on the bung. By means of an intermediate bushing of soft rubber (designated by the letter $f$) a perfect joint is formed at this point, which effectually prevents the leakage of gas or liquids from the interior of the barrel. To further assist in accomplishing the same object, the lower part of the bung is made slightly conical in shape, and the interior of the bushing B is shaped to correspond. Thereby the pressing of the bung home to its seat makes a gas and liquid tight connection which admits of no danger of leakage.

By reference to Figs. 1 and 2 it will be seen that there is an air-chamber in the interior of the bung, and, further, that within this air-chamber is a valve and vent apparatus D, which screws from below into the top place of the bung, and is provided with a ring or shoulder $d$ for making a tight connection with the said top place, in combination with a suitable gasket $g$ of soft rubber.

In the top of the vent D is a squared aperture for receiving the end of a key K, by means of which the vent can be turned from the outside. From the aperture referred to a passage F goes through the solid body of the vent and opens into the chamber in the bung, except when the mouth of the opening is closed by the valve G. (See Figs. 1, 2, 9, and 10.) The said valve normally closes the opening; but under certain circumstances, as will be seen, it is opened to allow a circulation of air for venting purposes. The valve G is lined with soft rubber, as shown, and is provided with a stop $h$, which limits its backward movement.

Below the vent D is a screw-threaded stop I, which closes the lower end of the bung after the vent has been screwed into place. This is so formed as to have a bearing at every point of the rim $i$, which is formed on it, and bears against the lower end of the bung when a stop or plug is screwed home.

In the normal position of the parts the plug I is secured tightly in place and the vent D is driven home within a conical opening $i'$ at the top of the plug. For this purpose the lower end of the vent is cone-shaped. It should be stated also that the plug I is provided with a central passage $j$, which opens into the barrel. Now, this being the normal arrangement of the parts, it is evident that the barrel will be perfectly sealed by my apparatus and that no leakage whatever can take place; but after the spigot has been inserted, and when it is desired to draw some of the liquor, then the key K is inserted in its place and the vent is given a half-revolution. By this means the vent is slightly lifted and the parts appear, as shown in Fig. 2. Thus a free passage is given for the air to enter as soon as the valve G is lifted. This is accomplished automatically, only the slightest pressure being needed to operate the said valve. Consequently the liquor will flow with perfect freedom, and at the same time there will be no escape of gases through the bung to the external air.

To provide against the lifting of the valve G by the gases in the barrel, I have made a ledge $k$ near the base of the vent, the position of which compels such gases as might tend to escape to pass round the bottom of the valve without being able to get under it. In this way the valve is only pressed tighter by the effort of the gases to free themselves. To aid in this, I extend the vertical walls of the vent far enough to pass beyond the limit of movement of the valve G, as shown most clearly in Fig. 9.

In using my invention I first see that the bottom of the bushing B is glazed like the rest of the interior of the barrel. At the same time I provide that the other parts of my bung which are exposed to the liquor within the barrel—for example, the plug I and the bottom of the bung itself—are suitably galvanized to prevent corrosion. I may also galvanize the outer end of the bung, if it is found desirable.

It will be seen that the use of my bung does away with the losses enumerated at the beginning of this specification. There are no bungs to be thrown away, my metallic bung being practically indestructible with ordinary usage. There are no vents to be lost or thrown away, the vent in my invention forming a permanent part of the bung. The interior glazing of the barrels is not injured by any pounding, as there is no necessity for pounding in the use of my apparatus. For the same reason there is no need for the renewal of the bung-stave more than of any other stave, and the whole barrel will wear out at the same time. I estimate that with my invention there will be no need to glaze the barrel oftener than once a year.

The important feature of my invention—that is to say, the most important feature—is the automatic vent in combination with the means of preventing the backflow of gases from the interior of the barrel. To this I shall call special attention in the claims which follow.

Having now described my invention, I claim—

1. A vent having means for attachment to a bung, an air-passage in the said vent, a gate or valve closing the said air-passage, and projecting walls within which the said gate or valve rests, as and for the purpose set forth.

2. A vent having means for attachment to a bung, an air-passage in the said vent, a gate or valve closing the said passage, and a ledge or shoulder projecting beyond the outer limit of movement of the said gate or valve, and projecting walls also extending beyond the said limit of movement, as and for the purpose set forth.

3. The combination, in a bung having an internal end opening, of a plug screwing into the said opening, the said plug having a passage ending in a conical valve-seat, and an adjustable vent terminating in a conical valve, as set forth.

4. In a bung, an adjustable valve-seat and an adjustable vent carrying the corresponding valve, the said vent having a shoulder co-operating with a suitable detent for limiting its movement away from the said valve-seat, as and for the purpose set forth.

5. In a bung, an adjustable valve-seat and an adjustable vent carrying the corresponding valve, the said vent being screwed into the upper wall of the bung and having a circular shoulder co-operating with the inner surface of the said wall, with an interposed gasket to prevent leakage, as and for the purpose set forth.

6. A metallic bung having an air-passage through it, the said air-passage being controlled at each of two points by a valve, the outer of the said valves being automatic and the inner of the said valves being formed in part by an adjustable portion of the bung, so as to be capable of operation by hand, as and for the purpose set forth.

In testimony whereof I have signed my name, in the presence of two witnesses, this 26th day of March, A. D. 1891.

CHARLES L. KLINE.

Witnesses:
G. H. STOCKBRIDGE,
D. E. HERVEY.